(12) United States Patent
Matsuhira et al.

(10) Patent No.: US 7,750,803 B2
(45) Date of Patent: *Jul. 6, 2010

(54) SECURITY SYSTEM AND MOVING ROBOT

(75) Inventors: Nobuto Matsuhira, Kanagawa-ken (JP); Kenichi Takahara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

This patent is subject to a terminal disclaimer.

(21) Appl. No.: 11/262,887

(22) Filed: Nov. 1, 2005

(65) Prior Publication Data

US 2006/0049940 A1    Mar. 9, 2006

Related U.S. Application Data

(63) Continuation of application No. 10/724,239, filed on Dec. 1, 2003, now Pat. No. 7,030,757.

(30) Foreign Application Priority Data

Nov. 29, 2002  (JP)  ............................. 2002-348059

(51) Int. Cl.
    *G08B 13/00* (2006.01)
(52) U.S. Cl. ....................................... 340/541; 340/521
(58) Field of Classification Search ................. 340/541, 340/521, 650, 522, 531, 508, 573.4, 16.34, 340/10.42
    See application file for complete search history.

(56) References Cited

U.S. PATENT DOCUMENTS 4,656,463 A    4/1987  Anders et al.
4,857,912 A    8/1989  Everett et al.
5,446,445 A *  8/1995  Bloomfield et al. ......... 340/521
7,030,757 B2 * 4/2006  Matsuhira et al. ........... 340/541

(Continued)

FOREIGN PATENT DOCUMENTS

JP         59-195786         11/1984

(Continued)

OTHER PUBLICATIONS

Nobuto Matsuhira, et al., "Development of a Service Robot with a Distributed Object Technology Based Controller", Proc. Conf. on Robomec '03, May 2003, 2 pages.

(Continued)

*Primary Examiner*—Daniel Wu
*Assistant Examiner*—Shirley Lu
(74) *Attorney, Agent, or Firm*—Oblon, Spivak, McClelland, Maier & Neustadt, L.L.P.

(57) ABSTRACT

A security system comprises a first sensor disposed in an area to be monitored in a building to monitor the area; a moving robot having a robot main body, a second sensor for monitoring the area to be monitored and a robot operation processor for moving the robot main body according to an operation mode data indicating an operation of the robot main body; a controller including first and second sensor information monitor means for collecting first sensor information and second sensor information which are acquired by the first and second sensors, and an operation mode data generator for generating the operation mode data from the first sensor information or the second sensor information and transmitting the operation mode data to the robot operation processor.

2 Claims, 15 Drawing Sheets

U.S. PATENT DOCUMENTS

2003/0193395 A1* 10/2003 Ahiska et al. .............. 340/540

FOREIGN PATENT DOCUMENTS

| JP | 60-63698 | 4/1985 |
|---|---|---|
| JP | 5-282585 | 10/1993 |
| JP | 5-300950 | 11/1993 |
| JP | 8-44985 | 2/1996 |
| JP | 8-124066 | 5/1996 |
| JP | 10-234681 | 9/1998 |
| JP | 11-283152 | 10/1999 |
| JP | 3067363 | 5/2000 |
| JP | 2001-52277 | 2/2001 |
| JP | 2001-125585 | 5/2001 |
| JP | 2001-222317 | 8/2001 |
| JP | 2002-574 | 1/2002 |

OTHER PUBLICATIONS

URL: http://www.sok.co.jp/top/html, 2003.
URL: http:/www.secomtown.com/hs/index_hs.asp, 2002.

* cited by examiner

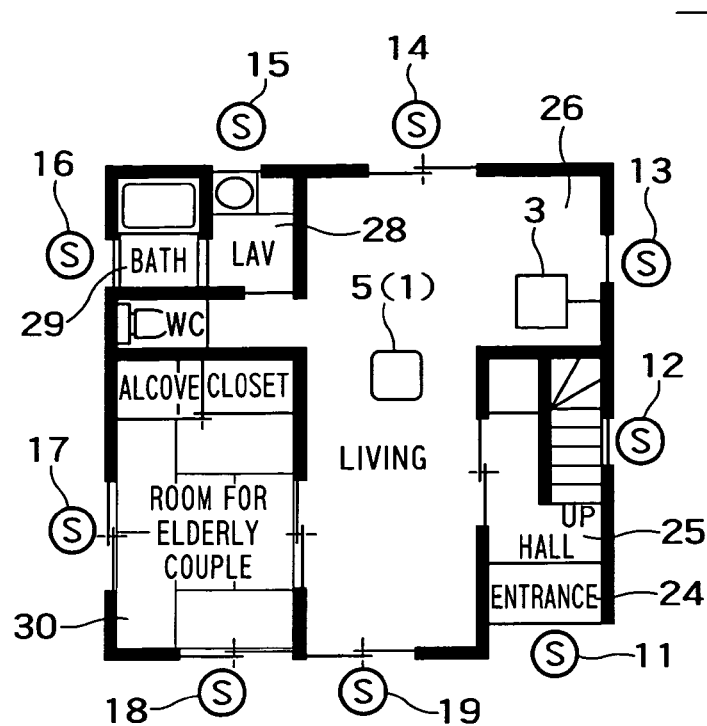
FIRST FLOOR
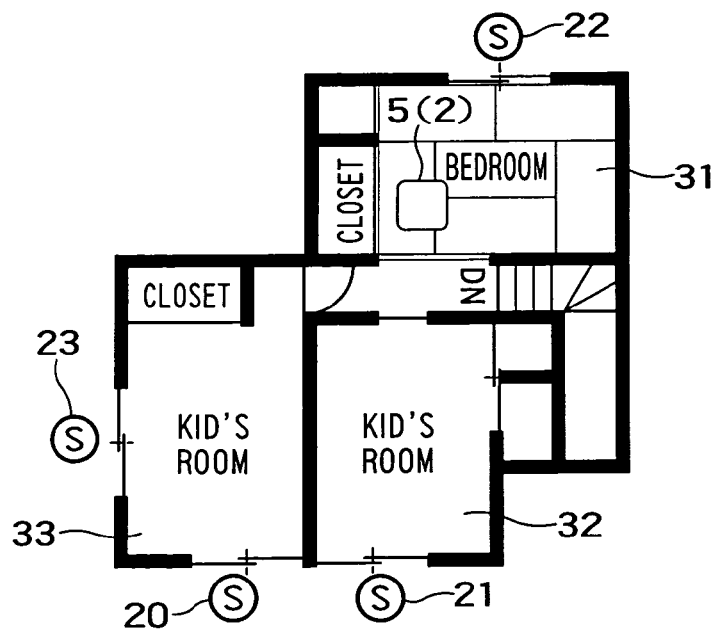
SECOND FLOOR
FIG. 5

EXAMPLE OR REMARK LEVEL DATA

| MODE | DAYTIME OR NIGHTTIME | ASPECT OF STAY IN RESIDENCE | REMARK LEVEL DATA S11~S19 | S20~S23 |
|---|---|---|---|---|
| ABSENT | DAYTIME | | 8 | 8 |
| | NIGHTTIME | | 10 | 10 |
| PRESENT | DAYTIME | CHILDREN/AGED ONLY | 8 | 8 |
| | | FAMILY ON FIRST FLOOR ONLY | 2 10 | 4 10 |
| | NIGHTTIME | CHILDREN/AGED ONLY | 8 | 6 |
| | | FAMILY ON FIRST FLOOR ONLY | | |

FIG. 6

EXAMPLE OF REMARK LEVEL DATA

EXAMPLE OF REMARK LEVEL DATA

| MODE | DAYTIME OR NIGHTTIME | ASPECT OF STAY IN RESIDENCE | SENSOR 34~36 | SENSOR 37 | ROOM FOR ELDERLY COUPLE | LIVING | BATH | LAV | ENTRANCE | KID'S ROOM | BEDROOM | STAIRCASE |
|---|---|---|---|---|---|---|---|---|---|---|---|---|
| ABSENT | DAYTIME | | 8 | 8 | 8 | 8 | 8 | 8 | 8 | 8 | 8 | 0 |
| ABSENT | NIGHTTIME | | 10 | 10 | 10 | 10 | 10 | 10 | 10 | 10 | 10 | 0 |
| PRESENT | DAYTIME | CHILDREN/AGED ONLY | 8 | 8 | 8 | 8 | 8 | 8 | 8 | 8 | 8 | 10 |
| PRESENT | DAYTIME | FAMILY ON FIRST FLOOR ONLY | 4 | 6 | 4 | 4 | 4 | 4 | 6 | 6 | 6 | 6 |
| PRESENT | NIGHTTIME | CHILDREN/AGED ONLY | 10 | 10 | 10 | 10 | 10 | 10 | 10 | 10 | 10 | 6 |
| PRESENT | NIGHTTIME | FAMILY ON FIRST FLOOR ONLY | 8 | 6 | 8 | 8 | 8 | 8 | 8 | 6 | 6 | 6 |

FIG. 8

SECURITY SYSTEM AND MOVING ROBOT

CROSS-REFERENCE TO RELATED APPLICATIONS

The present application is a Continuation of U.S. application Ser. No. 10/724,239, filed on Dec. 1, 2003, and in turn claims priority to Japanese Patent Application No. 2002-348059, filed on Nov. 29, 2002 the entire contents of both of which are incorporated herein by reference.

BACKGROUND OF THE INVENTION

1. Field of the Invention

This invention relates to a security system and more particularly to a security system using a moving robot.

2. Related Background Art

Lock picking is a more common means of illegal entry among burglars these days, and this has raised the need for better security against lock picking. Accordingly, security systems formerly intended for commercial buildings and luxury residences have spread to ordinary apartments and houses as well. Home security systems use security cameras, sensors to detect the movements of doors or windows, human motion sensors, vibration sensors for detecting breakage of windowpanes, and the like, which are installed within the residence. If a sensor detects any abnormal condition within the residence, a server or other similar device installed within the residence sends an alarm to a security agency.

There are some disclosures related to this art, such as JP-H05-300950-A, JP-H08-124066-A, JP-H08-44985-A, JP-S59-195786-A, JP-2001-125585-A, JP-2001-322317-A, URL:http://www.sok.co.jp/>, and URL:http://www/secom-town.com/hs/index_hs.html>.

However, existing home security systems suffer from too many false alarms caused by oversensitive sensors, for example, and security guards must be dispatched to the scene of the alarm for each incident. However, it takes time for security guards to reach the scene and ascertain the situation.

One solution for these problems is to install security cameras in all rooms of a residence. However, because of privacy issues, this solution cannot be widely accepted. Moreover, it is not practical to install security cameras or other sensors in all rooms or spaces of a house.

SUMMARY OF THE INVENTION

In view of these problems, the present invention intends to simplify security systems for safeguarding people in houses and other indoor spaces.

One aspect of the present invention is a security system comprising a first sensor disposed in an area to be monitored in a building to monitor the area; a moving robot having a robot main body, a second sensor for monitoring the area to be monitored and a robot operation processor for moving the robot main body according to an operation mode data indicating an operation of the robot main body; a controller including first and second sensor information monitor means for collecting first sensor information and second sensor information which are acquired by the first and second sensors, and an operation mode data generator for generating the operation mode data from the first sensor information or the second sensor information and transmitting the operation mode data to the robot operation processor.

Another aspect of the present invention is a moving robot provided in a security system, which includes a stationary sensor installed in an area to be monitored in a building to monitor the area and a server transmitting abnormal condition data indicating an abnormal condition when the stationary sensor detects the abnormal condition, comprising:

a robot main body movable in the area to be monitored; an on-board sensor mounted on the robot main body to monitor the area; a sensor information monitor collecting at least on-board sensor information acquired by the on-board sensor; an operation mode data generator generating operation mode data of the robot main body by using at least the on-board sensor information; and a robot operation processor activating the robot main body in accordance with the operation mode data, wherein the moving robot cooperates with the stationary sensor to monitor the area to be monitored.

BRIEF DESCRIPTION OF THE DRAWINGS

FIG. 5 is a diagram showing a layout of a home security system taken as the first embodiment, which is installed in a residence;

FIG. 6 is a diagram showing, in form of a remark level data table, an example of remark level data that may be set in respective stationary sensors of FIG. 5;

FIG. 8 is a diagram showing, in form of a remark level data table, an example of remark level data that may be set in respective stationary sensors and respective rooms of FIG. 7;

DETAILED DESCRIPTION OF THE INVENTION

First explained is a basic configuration of a security system according to the first embodiment of the invention.

Figure 1:
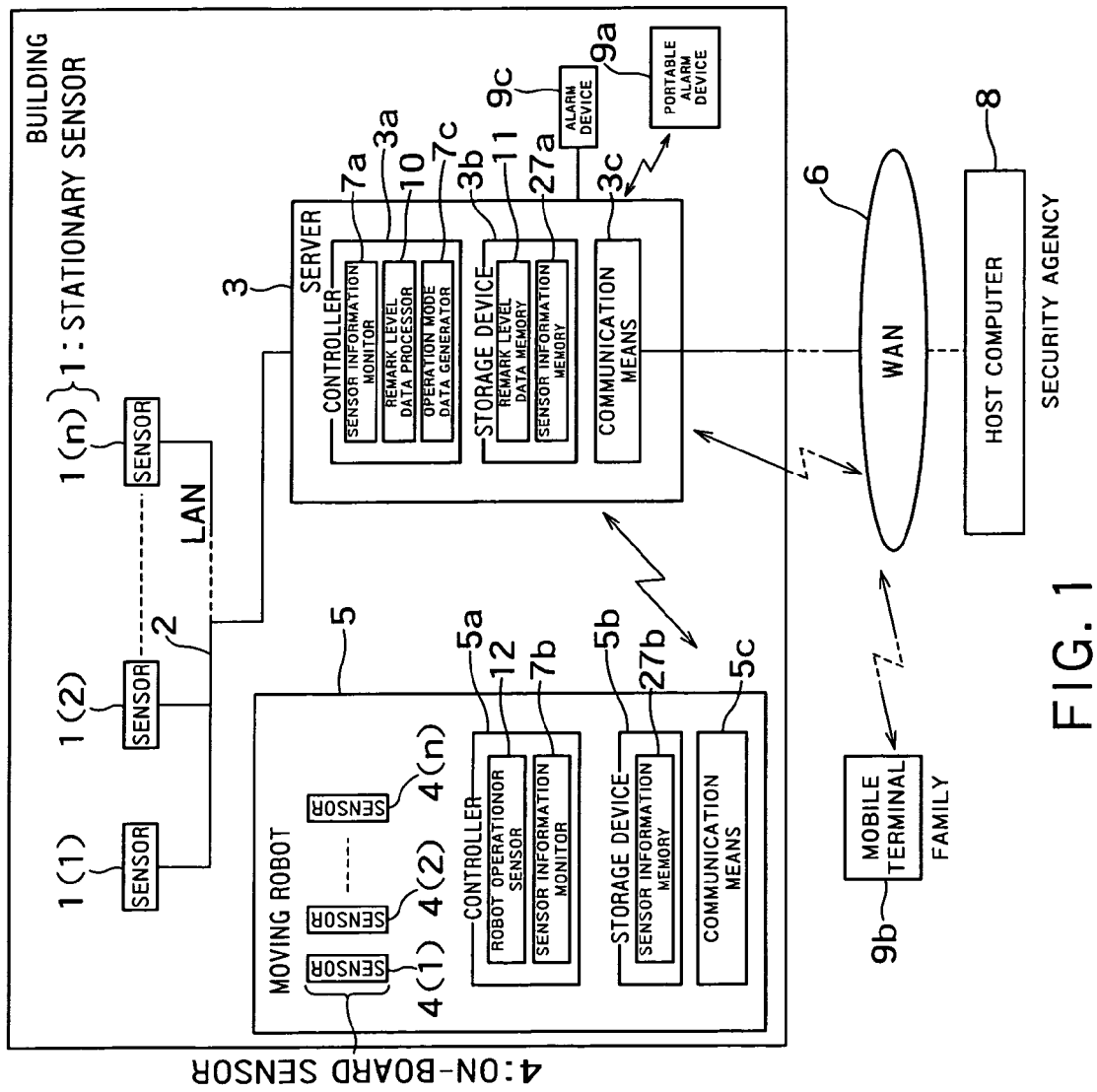
FIG. 1 is a block diagram showing the entire configuration of a security system according to a basic embodiment of the invention.

FIG. 1 is a block diagram showing the entire configuration of a security system according to an embodiment of the invention.

Stationary security sensors 1(1), 1(2), ... 1(n) are installed on windows, entrances, etc. of a certain kind of facility or of a private residence, for example. The stationary sensors 1 may be image sensors (video cameras), vibration sensors, acoustic sensors (microphones), infrared sensors, ultrasonic wave sensors, or the like, for example.

Stationary sensors 1 installed in such a building are connected to a communicator 3c of a home server (or a server) 3 for controlling various devices in the building through a network (such as a local area network (LAN)) 2 installed in the building. The home server 3 includes a sensor information monitor 7a. The sensor information monitor 7a receives (collects) detection data (sensor information) from the stationary sensors 1 inside the building, and checks from the received sensor information whether there is any abnormal condition in the building. The received sensor information is stored in a sensor information storage device 27; and the sensor information monitor 7a can use the stored sensor information whenever necessary. Upon detecting any unusual condition in the building from the sensor information acquired by the stationary sensor 1, the sensor information monitor 7a generates abnormal condition data indicating the presence of an abnormal condition in the building (which may include sensor information upon occurrence of the abnormality). The abnormal condition data is transmitted from a communication means 3c in charge of wireless or cable communication. In greater detail, the sensor information monitor 7a transmits the abnormal condition data to a host computer 8 in a security agency and a mobile communication terminal 9b such as a portable phone, which a family member carries with him/her, through a wide area network (WAN) 6. In addition, the sensor information monitor 7a transmits abnormal condition data indicating the abnormal condition in the building to a portable alarm device 9a carried by a family member in the building, etc., and to an alarm device 9c connected to the communication means 3c of the home server 3, through wireless LAN or other wireless communication system. On the other hand, the sensor information monitor 7a sends sensor information acquired by the stationary sensor 1 to the external host computer 8.

Then, the host computer 8 stores periodically received sensor information and abnormal condition data received upon occurrence of the abnormal condition (including sensor information upon occurrence of the abnormal condition) in a storage device (not shown).

Figure 4:
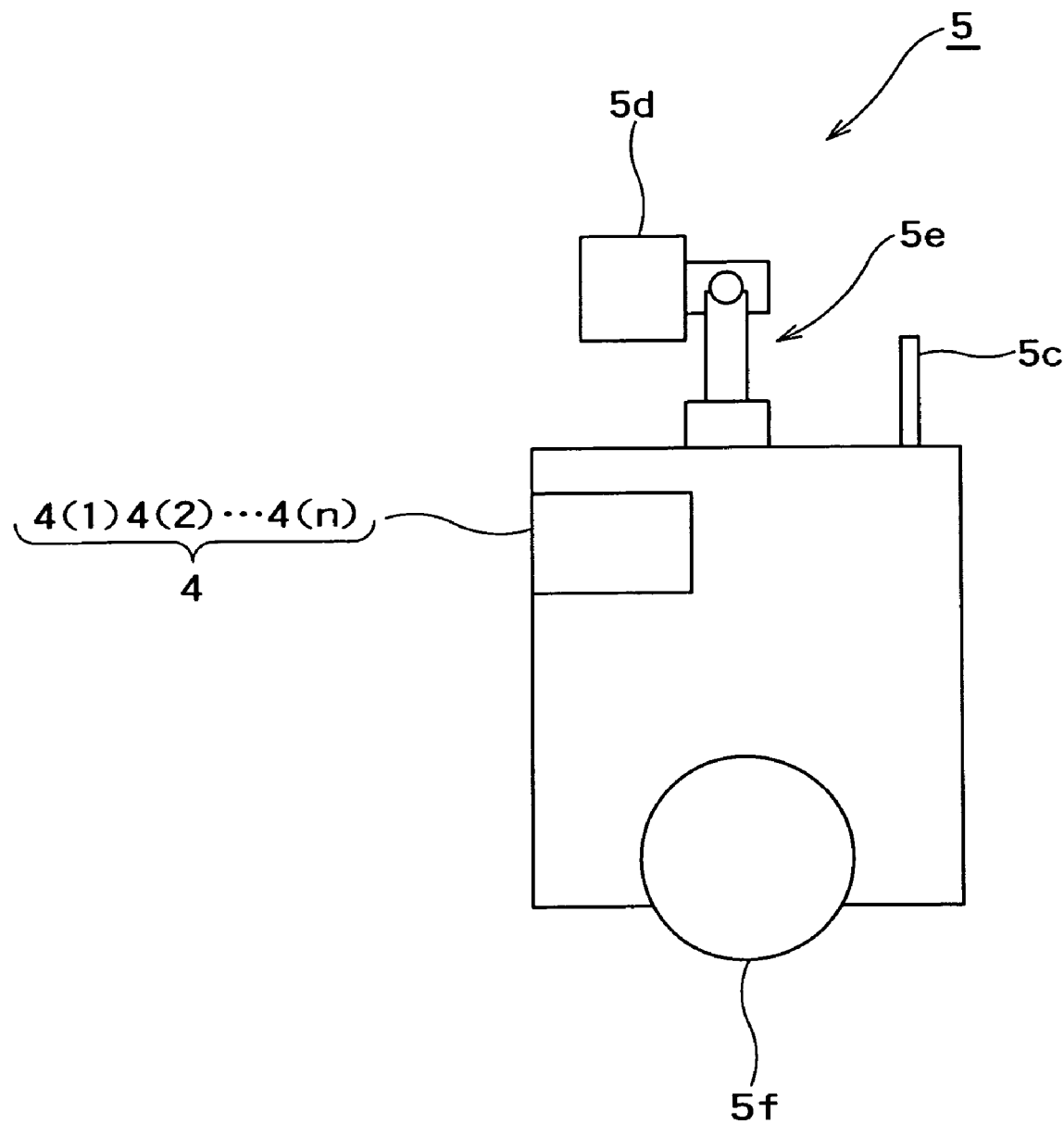
FIG. 4 is a diagram showing a configuration of the moving robot shown in FIG. 1.

In the building or residence, a moving robot 5 movable in the building, etc. is allocated. An example of the moving robot 5 is shown in FIG. 4. The moving robot 5 is equipped with various kinds of sensors (also called second sensors or on-board sensors) 4(1), 4(2), ... 4(n) for monitoring situations in the building, etc. while patrolling it. The on-board sensors 4 may include a vibration sensor, acoustic sensor, infrared sensor and ultrasonic wave sensor, for example. The moving robot 5 is further equipped with a video camera 5d for acquiring images, a video camera swing mechanism 5e for orienting the video camera 5d vertically. and horizontally, and a wheel 5f as a means for traveling in the building, etc. Furthermore, the moving robot 5 has a robot operation processor 12 for controlling the operation of the robot on the basis of various operation mode data as a part of the controller (robot controller) 5a. The operation mode data is generated by an operation mode data generator 7c, explained later. The moving robot 5 operable in various operation modes includes a sensor information monitor 7b for collecting sensor information detected by the on-board sensors 4. The sensor information monitor 7b stores the collected sensor information in a sensor information storage region 27a of the storage device 27b, and can use it whenever necessary. The storage device 27b also stores map information (map data) of the building, etc. in its other region. The robot operation processor 12 for controlling the operation of the moving robot 5 moves the moving robot 5 to a target point on the map information by using the map information, on-board sensors 4, and so forth.

On the other hand, the sensor information monitor 7b transmits the collected sensor information to the sensor information monitor 7a of the home server via the communication means 5c for wireless communication. The sensor information monitor 7a processes the received sensor information in the same manner as the sensor information acquired from the stationary sensor 1. For example, if an abnormal condition is detected, then the sensor information monitor 7a transmits the abnormal condition data to the host computer 8, etc., and additionally, it periodically transmits the sensor information from the sensor information monitor 7b to the host computer 8, etc. The host computer 8 stores the received sensor information and abnormal condition data in the storage device. That is, the host computer 8 periodically receives and stores sensor information from the sensor information monitor 7a and the sensor information monitor 7b, and receives and stores abnormal condition data upon occurrence of an abnormal condition. Therefore, once an abnormal condition, such as an intrusion, occurs in the building, etc., data is held in the external host computer 8 even if the intruder breaks the moving robot 5 or server 3, and it is possible to know what happened in the building, etc. That is, the data stored in the host computer 8 can be strong evidence.

Here is made an explanation about remark level data that is one of the most important features of the security system according to this embodiment. In short, the remark level data is the degree of weight previously determined for each of targets to be monitored by the stationary sensors 1 and the on-board sensors 4, such as individual rooms, places, sensors, people, etc. The use of the remark level data optimizes operation of the moving robot 5 in accordance with individual conditions (see FIGS. 6 and 8). As an example of employment of the remark level data, the remark level data for a certain room may be determined high, and the remark level data for another room may be determined low on a scale of importance. Accordingly, the frequency of the patrol or the duration of time of the guard may be increased for a certain room and decreased for another room. As such, the remark level data can change the operation mode of the moving robot 5 depending upon the target to be monitored. The remark level data can be modified after once determined. A more detailed example of determination of the remark level data will be explained later.

A remark level data memory 11 is provided in the storage device 3 of the home server 3b or the controller 5a (in the storage device 3 in the example of FIG. 1) for storing the remark level data determined for individual targets to be monitored such as individual rooms or stationary sensors 1 in form of a remark level data table, for example. Additionally, a remark level data processor 10 is provided in the home server 3. The remark level data processor 10 receives sensor information acquired by the stationary sensors 1 and the on-board sensors 4 through the sensor information monitor 7a, and modifies the remark level data in the remark level data memory 11 on the basis of the sensor information. Another circuit may be provided in the home server 3 to enable changes of the remark level data acquired from an input interface such as input buttons attached outside the home server 3. The operation mode data generator 7c is provided in the home server 3. The operation mode data generator 7c generates operation mode data of the moving robot 5, based on the remark level data in the remark level data memory 11. The remark level data memory 11, remark level data processor 10 and operation mode data generator 7c explained in conjunction with the remark level data may be provided in the moving robot 5 instead of the home server 3.

Figure 2:
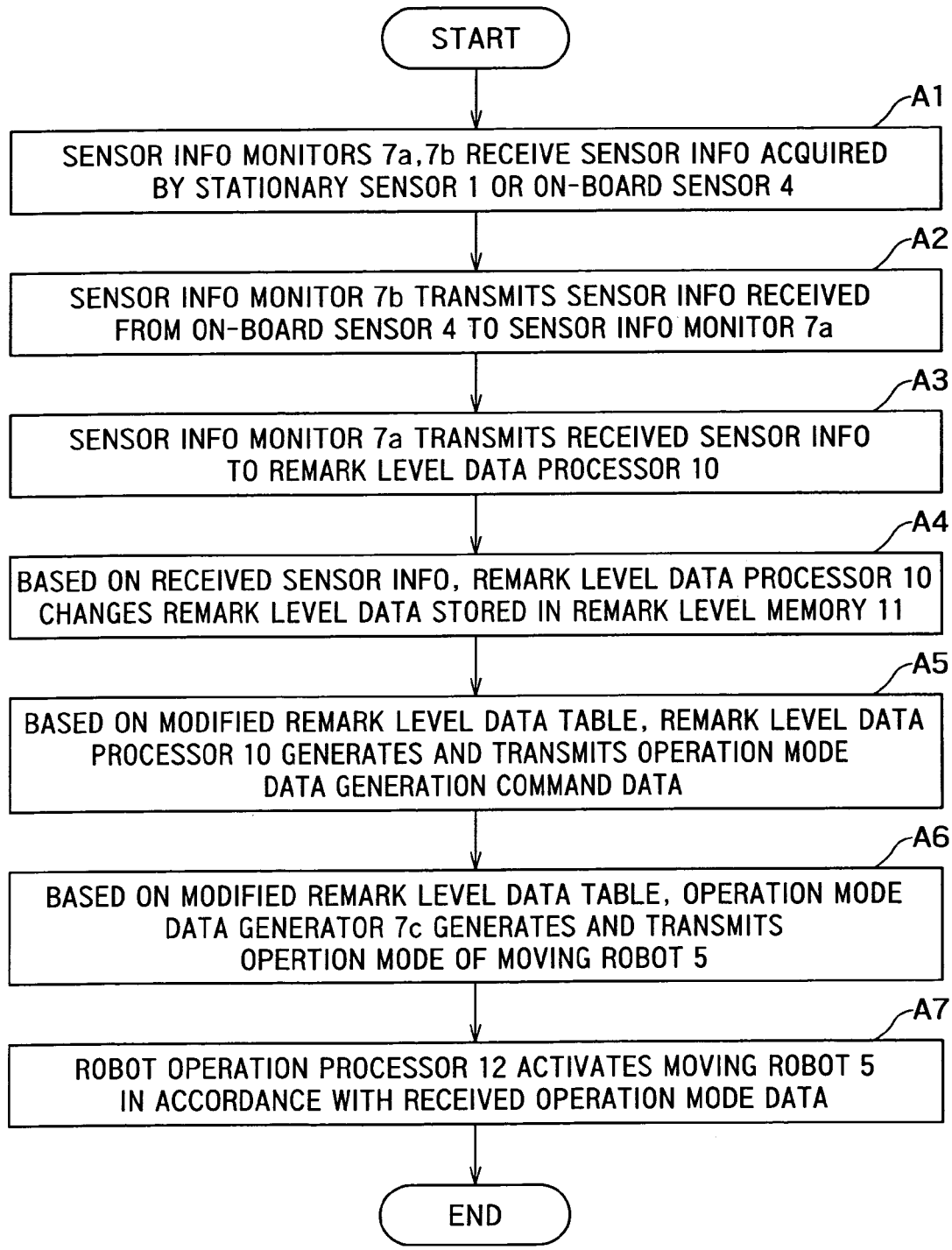
FIG. 2 is a flowchart of a series of procedures up to change of the operation mode of a moving robot 5 by using sensor information (detection data) detected by stationary sensors 1 or on-board sensors 4.

FIG. 2 is a flowchart of a series of procedures up to a change of the operation mode of the moving robot 5 by using sensor information (detection data) detected by the stationary sensors 1 or on-board sensors 4.

Figure 3:
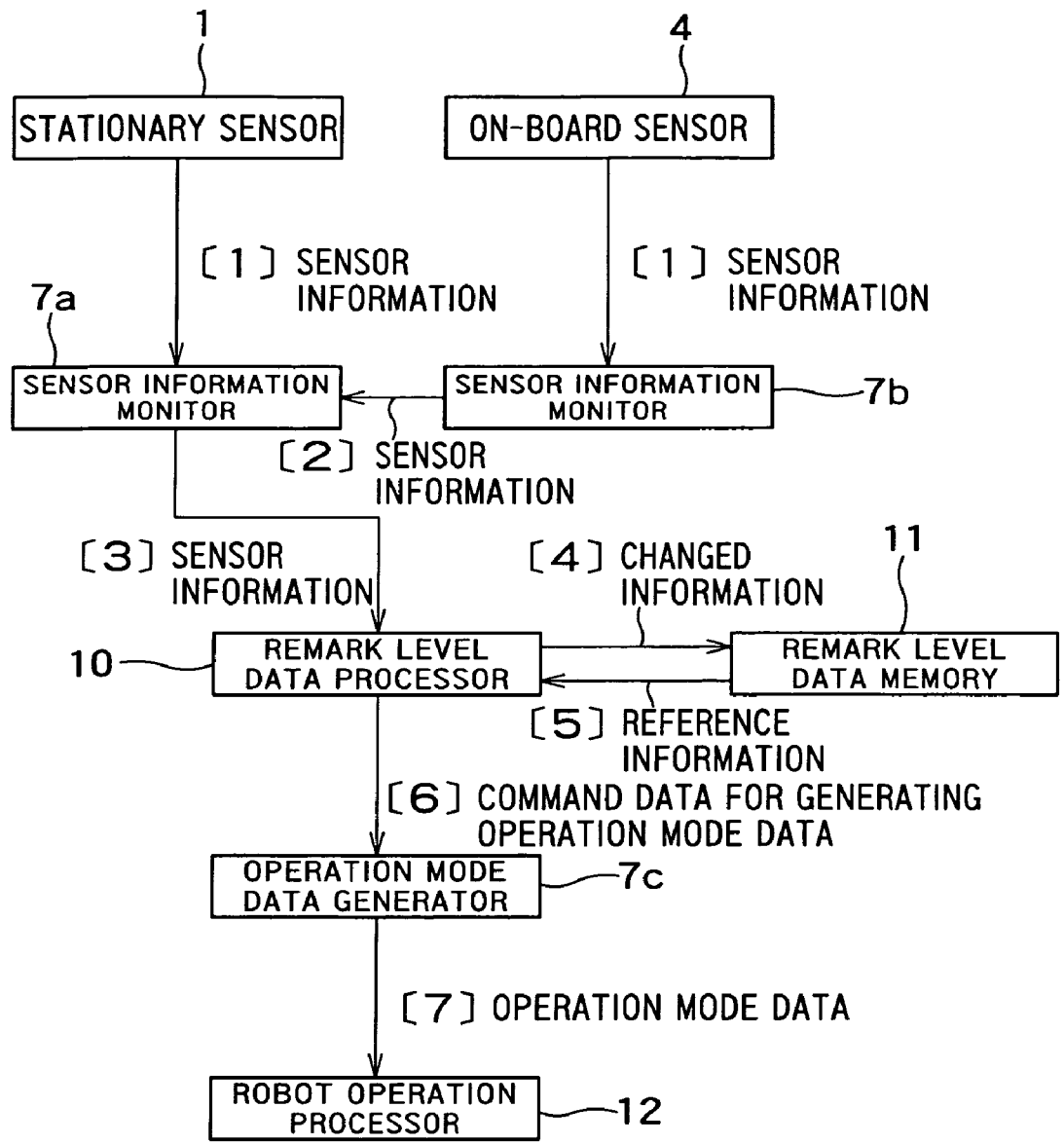
FIG. 3 is a diagram showing flows of data among devices in the procedures shown in the flowchart of FIG. 2.

FIG. 3 is a diagram showing flows of data exchanged among devices shown in FIG. 1 in the procedures shown in the flowchart of FIG. 2.

With reference to FIGS. 2 and 3, explained below is a series of procedures for changing the operation mode of the moving robot 5 by using the sensor information detected by the stationary sensors 1 or on-board sensors 4 as well as the data exchanged among the respective devices of FIG. 1 in the changing procedures.

The sensor information monitor 7a, 7b receive sensor information detected by the stationary sensors 1 or on-board sensors 4 (A1 of FIG. 2 and [1] of FIG. 3). The sensor information monitor 7b transmits the sensor information received from the on-board sensors 4 to the sensor information monitor 7a in the home server 3 (A2 of FIG. 2 and [2] of FIG. 3). The sensor information monitor 7a transmits the sensor information received from the stationary sensors 1 or on-board sensors 4 to the remark level data processor 10 (A3 of FIG. 2 and [3] of FIG. 3). The remark level data processor 10 changes the remark level data stored in the remark level data memory 11 on the basis of the sensor information (A4 of FIG. 2 and [4] of FIG. 3). Based on the post-change remark level data table (reference information) ([5] of FIG. 3) containing both the remark level data after the change and the remark level data before the change, the remark level data processor 10 generates command data for generating operation mode data and transmits it to the operation mode data generator 7c (A5 of FIG. 2 and [6] of FIG. 3). Based on the command data, the operation mode data generator 7c generates operation mode data of the moving robot 5, and transmits it to the robot operation processor 12 (A6 of FIG. 2 and [7] of FIG. 3). The robot operation processor 12 moves the moving robot 5 in accordance with the received operation mode data (A7 of FIG. 2).

For better understanding of the advantages of changing the operation mode of the moving robot 5 with the use of the remark level data, a practical example of a change process of the remark level data is explained below.

As a first example of a situation in which a change of remark level data is preferable, here is assumed and explained the case where a stationary sensor set in a particular room detects abnormality more frequently than others (the abnormality detection frequency is higher).

In general, sensors installed in residences for security purposes frequently issue false alarms. However, security agencies employing conventional security systems have to dispatch security guards in response to all alarms, including false alarms. This is a large burden to security agencies. To alleviate the burden, the embodiment of the invention employs remark level data to assign a higher remark level to a room for which a sensor with a high frequency of abnormality detection is installed. That is, the embodiment sends the moving robot 5 more frequently to the room with the higher frequency of abnormality detection to check it. Thereby, security agencies can figure out earlier the actual situation in certain rooms upon detection of abnormal conditions through video cameras, etc. mounted on moving robots 5. Therefore, false alarms can be settled earlier, and the frequency of dispatching security guards can be reduced. Furthermore, since a family member outside his/her residence can know the cause of the detection of abnormality immediately from a message sent by a security agency, for example, he/she can pursue his/her own daily duties in peace.

As a second example of a situation in which a change of remark level data is preferable, here is assumed and explained the case where all of the family members have left a particular room, for example.

In a residence having many rooms, it often occurs that no one pays attention to the entrance zone when all family members gather in an inner room. Actually, shops often suffer intrusion from their unmanned rear. Taking this into account, the security system according to the embodiment of the invention controls the moving robot 5 to move in the house to detect where the family members stay. Then, the security system assigns a lower remark level to rooms where the family members are, and reduces the frequency of patrol or checks only upon request. On the other hand, the security system assigns a high remark level to rooms and zones further from the family members, increases the monitoring time for them, or raises the sensitivity of the sensor. As such, the remark level data can be changed depending upon the room or zone where the family members stay to change the monitoring mode.

In hot seasons, people want to leave the entrance doors and upstairs windows open to circulate air. However, people hesitate to leave the doors and windows open unless family members are near the entrances. It is unrealistic to install sensors in all rooms and spaces of the house. To cope with this issue, the security system according to the embodiment assigns a higher remark level to the opened entrances and controls the moving robot 5 to watch longer the entrances where no family member is present. Additionally, another moving robot 5 is disposed upstairs to patrol rooms with windows opened and without attendance of any of the family slightly more frequently. Thus, the family can live in peace.

As a third example of a situation in which a change of remark level data is preferable, here is assumed and explained the case where the family includes a baby or bedridden person.

If a family includes a baby or an ill person, a higher remark level is preferably assigned to the room or space where the baby or ill person lies. For example, a microphone, video camera or other detector for the room or space where the baby or patient lies may be raised in sensitivity to monitor him/her more carefully. When the others of the family are farther apart from the baby or patient, they will fail to hear the baby's cry or the patient's call. Therefore, a microphone used for detecting the baby's cry or patient's call may be raised in sensitivity to inform the other family members of the situation reliably even when they are separated from the baby or patient. Especially for a patient, the detector detects abnormal breathing sounds or snoring sounds. For an aged person who wanders about in a way that may be dangerous to himself/herself, the security system increases the image renewal frequency and sensitivity of a video camera, for example, to detect his/her movements reliably. A family having a patient or an aged person who wanders about must watch him/her day and night. Therefore, if the moving robot 5 takes over any part of the family's task of watching the patient or the aged person, the rest of the family is significantly alleviated from this heavy task.

Herein below, the security system according to the embodiment of the invention will be explained in greater detail.

FIRST EMBODIMENT

Monitoring System Using Remark Level Data

FIG. 5 is a diagram showing a layout of a home security system taken as the first embodiment, which is installed in a residence. The layout of the residence is shown only for the purpose of an example, and the embodiment will have the same effects regardless of the layout of rooms and spaces of a residence.

The home security system is configured as explained below.

The entrance and windows of all first-floor rooms and upstairs rooms of this residence are equipped with stationary sensors (sensing system) 11 through 23. More specifically, the stationary sensors 11~23 are attached to the first-floor entrance 24, and windows of the staircase (hall) 25, living room 26, washroom 28, bathroom 29, room for an elderly couple 30, upstairs bedroom 31, children's rooms 32, 33. The stationary sensors may be, for example, window motion sensors, cameras, infrared sensors, vibration sensors, microphones, etc. A home server (server) 3 connected to these stationary sensors 11~23 is disposed in the living room 26 on the first floor.

On the other hand, moving robots (home robot systems) 5(1), 5(2) equipped with various kinds of sensors are disposed on the first floor and upstairs, respectively. The moving robots 5(1), 5(2) patrol individual rooms while avoiding obstacles on the floors by using the sensors mounted thereon. Their movements from one room to another are ensured by doors prepared for the moving robots 5, automatic doors, opening and closing motions by arms exclusive for the moving robots, etc.

The moving robots 5(1), 5(2) are further equipped with a remark level data processor 10, remark level data memory 11 and operation mode data generator 7c for various procedures including a change of remark level data instead of the home server 3. That is, the moving robots 5(1), 5(2) sense information from the stationary sensors 11~23 in addition to the sensor information from the on-board sensors 4, and execute a change of the remark level data and other procedures, based on those pieces of sensor information. Among these procedures, the processing for changing the remark level data using the sensor information from the stationary sensors 11~23 is explained below.

The moving robots 5(1), 5(2) receive sensor information acquired by the stationary sensors 11~23 installed on windows of the rooms and the entrance directly or via the home server 3. Based on the received information, the moving robots 5(1), 5(2) monitor whether there is any abnormal condition in the residence. More specifically, the moving robots 5(1), 5(2) monitor in receipt of the sensor information from the stationary sensor 11~23 to find any abnormal condition such as extraordinary increase of vibrations in windowpanes, the rising of an aged person from his/her bed, the cry of a baby, vacancy of rooms, and so on. If the moving robots 5(1), 5(2) find any abnormal condition in the residence, they modify the remark level data stored in the remark level data memory 11 by means of the remark level data processor 10, and behave in accordance with the condition.

As explained above, the moving robots 5(1), 5(2) receive sensor information acquired by the stationary sensors 11~23, and monitor to find any abnormal condition in the residence from the received sensor information. However, it will be inefficient to determine the remark level data to operate all of the stationary sensors 11~23 always under the same conditions. Therefore, as shown in FIG. 6, the remark level data is determined adequately to assign optimum remark levels to the respective stationary sensors 11~23 in different rooms or places, depending upon the current conditions, namely, presence or absence of the family, daytime or nighttime, or who in the family is at home.

FIG. 6 shows a remark level data table of remark levels assigned to the stationary sensors 11~23. Here is explained how to read FIG. 6.

As shown in FIG. 6, the remark level 8 is assigned to all stationary sensors 11~23 in the absence mode in daytime, and the remark level 10 is assigned to all stationary sensors 11~23 in the absence mode in nighttime. As such, the remark level is increased especially in nighttime to tighten the guard. The numerical values of the remark level data may be the frequencies of patrol. More specifically, when the remark level is 8, the moving robots 5(1), 5(2) may patrol eight times in unit time. When the remark level is 10, they may patrol ten times in unit time. The unit time may be determined at the user's convenience.

If only children and/or aged persons stay home in the presence mode in daytime, then the remark level 8 is assigned to all stationary sensors 11~23. If only children and/or aged persons stay home in the presence mode in nighttime, then the remark level 10 is assigned to all stationary sensors 11~23. As such, when only children and/or aged persons stay home, the remark level is increased also in the presence mode equivalently to the absence mode.

In the presence mode in daytime, if no one in the family is on the first floor and no one stays upstairs, the remark level 2 is assigned to the stationary sensors 11~19 on the first floor, and the remark level 4 is assigned to the stationary sensors 20~23 upstairs. In the presence mode in nighttime, if all of the family stay upstairs and no one stays on the first floor, the remark level data 8 is assigned to the stationary sensors 11~19, and the remark level 6 is assigned to the stationary sensors 20~23 upstairs. As such, a higher remark level is assigned to the stationary sensors on the floor where no one of the family stays.

The remark level data determined for the respective stationary sensors may be modified upon or after the purchase of the home security system at user's convenience. The purchaser or seller of the home security system may add further items and remark levels in the remark level data table upon or after the purchase.

As explained above, it is possible to realize an energy-saving, efficient home security system by assigning appropriate remark levels to individual stationary sensors 11~23.

For example, by lowering the remark level assigned to a stationary sensor attached to the window of a certain room, the frequency of the surveillance by this stationary sensor is reduced from once per several minutes to one per one hour, for example. As a result, great energy saving is attained, and the security system can be operated efficiently. When the remark level assigned to a stationary sensor attached to the window of a certain room is 8, by lowering the remark level 8down to the remark level 4, sensitivity of the stationary sensors attached to the window of a certain room are reduced by one half. As a result, great energy saving and efficient operation are accomplished.

The remark levels indicated above are determined for stationary sensors 11~23 themselves, which are attached to windows of individual rooms. However, they may be assigned to spaces such as rooms and corridors, or more detailed portions such as doors, desks, bookshelves or drawers, or the bodies of ill family members or animals. If remark levels are determined for individual rooms among those examples, the security system can be operated efficiently as mentioned above, by lowering the remark level 8 once determined for a certain room down to the remark level 4 so as to reduce the patrol frequency of the room by one half. As a result, great energy saving is accomplished similarly.

The foregoing embodiment has been explained as using moving robots 5(1), 5(2) to patrol the respective floors. However, it is acceptable for the moving robots 5(1), 5(2) not to patrol them. Instead, they may stay at certain positions and perform the guard by effectively using a video camera 5d and a wide camera swinging mechanism 5e (see FIG. 4).

SECOND EMBODIMENT

Monitoring System 2 Using Remark Level Data

Figure 7:
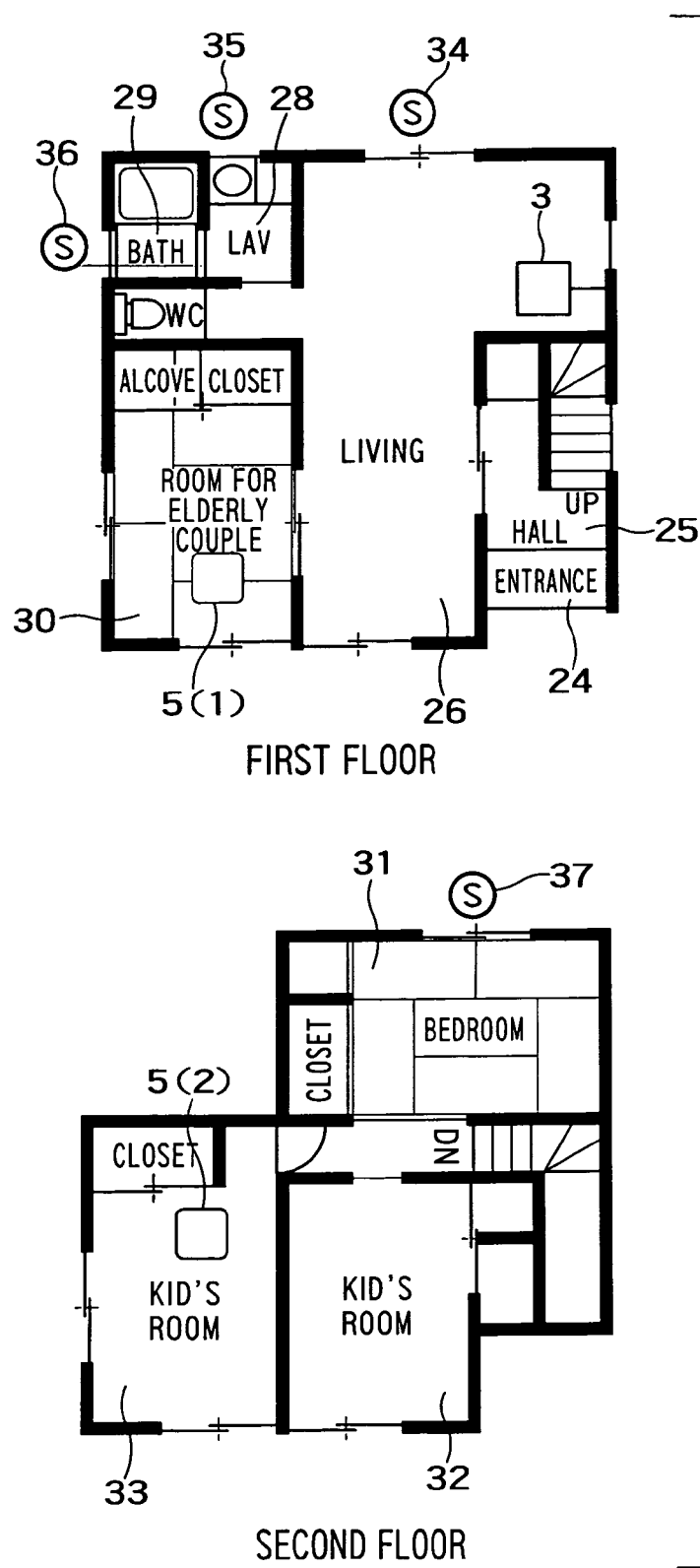
FIG. 7 is a diagram showing a layout of a home security system taken as the second embodiment, which is installed in a residence.

FIG. 7 is a diagram showing a layout of a home security system taken as the second embodiment, which is installed in a residence.

As shown in FIG. 7, this security system does not equip noticeable windows and entrance with stationary sensors but selectively equips only unnoticeable windows (ex. windows of Living room 26, Lav 28 bath room 29 and bed room 31) with stationary sensors. The moving robots 5(1), 5(2) provided on the first-floor and the second floor detect intruder from the windows, etc. not equipped with stationary sensors.

This security system does not equip noticeable windows and entrance with stationary sensors but selectively equips only unnoticeable windows with stationary sensors. Therefore, this security system can use stationary sensors and moving robots in a more effective cooperative manner. That is, the windows, etc. equipped with stationary sensors are monitored by the stationary sensors and the moving robots are driven to patrol the other windows, entrance, etc. not equipped with stationary sensors. The stationary sensors and the moving robots cooperate to monitor the windows, etc. effectively. As such, since the moving robots 5(1), 5(2) are used to monitor the windows, etc. not equipped with stationary sensors, the importance of the moving robots 5(1), 5(2) is greater than that of the first embodiment configured to equip all windows and the entrance with stationary sensors.

FIG. 8 shows an example in which remark levels are assigned to sensors 34~36 on the first floor, sensor 37 upstairs, rooms and entrance 24~26, 28~33 on the first floor and upstairs, depending upon the absence or presence of the family in the residence, time zones of a day such as daytime or nighttime, and family members who stay home. Since the stationary sensors are equipped selectively, this embodiment determines remark levels in greater detail than the example shown in FIG. 6 explained in conjunction with the first embodiment. FIG. 8 can be read in substantially the same manner as FIG. 6. Therefore, its explanation is omitted. Remark levels for individual rooms are determined from the standpoint of security. For example, remark levels may be changed depending on whether the windows are furnished with lattice structures. The reason for assigning a remark level to the staircase (hall) 24 lies in using the moving robots 5(1), 5(2) to watch children and aged persons and give an alarm for danger, if any, in order to protect them from slipping down the staircase. Therefore, as shown in FIG. 8, in the absence mode where children and aged persons do not stay home, it is not necessary to watch children and aged persons, and the remark level 0 is assigned to the staircase 24. Alarming operations of the moving robots 5(1), 5(2) will be explained in conjunction with subsequent embodiments in greater detail.

As explained above, according to the instant embodiment, moving robots and stationary sensors can be used in a cooperative manner more effectively by installing stationary sensors selectively and assigning remark levels determined in greater detail. Therefore, the power for operating the home security system can be better saved. Furthermore, since the expense for the security system increases with the number of stationary sensors installed and further increases for labor when adding sensors later, the instant embodiment is advantageous for overcoming this problem in addition to the power-saving effect.

THIRD EMBODIMENT

Method of Changing Remark Level Data

In this embodiment, remark level data once determined for stationary sensors, rooms, spaces, persons, etc. are dynamically changed on the basis of sensor information detected by stationary sensors and on-board sensors. Thus, the embodiment attains more flexible monitoring.

In the first and second embodiments, the moving robot 5 is equipped with the remark level processor 10, remark level data memory 11, and operation mode data generator 7c. In this and subsequent embodiments, the home security servers 3 includes those components.

Figure 9:
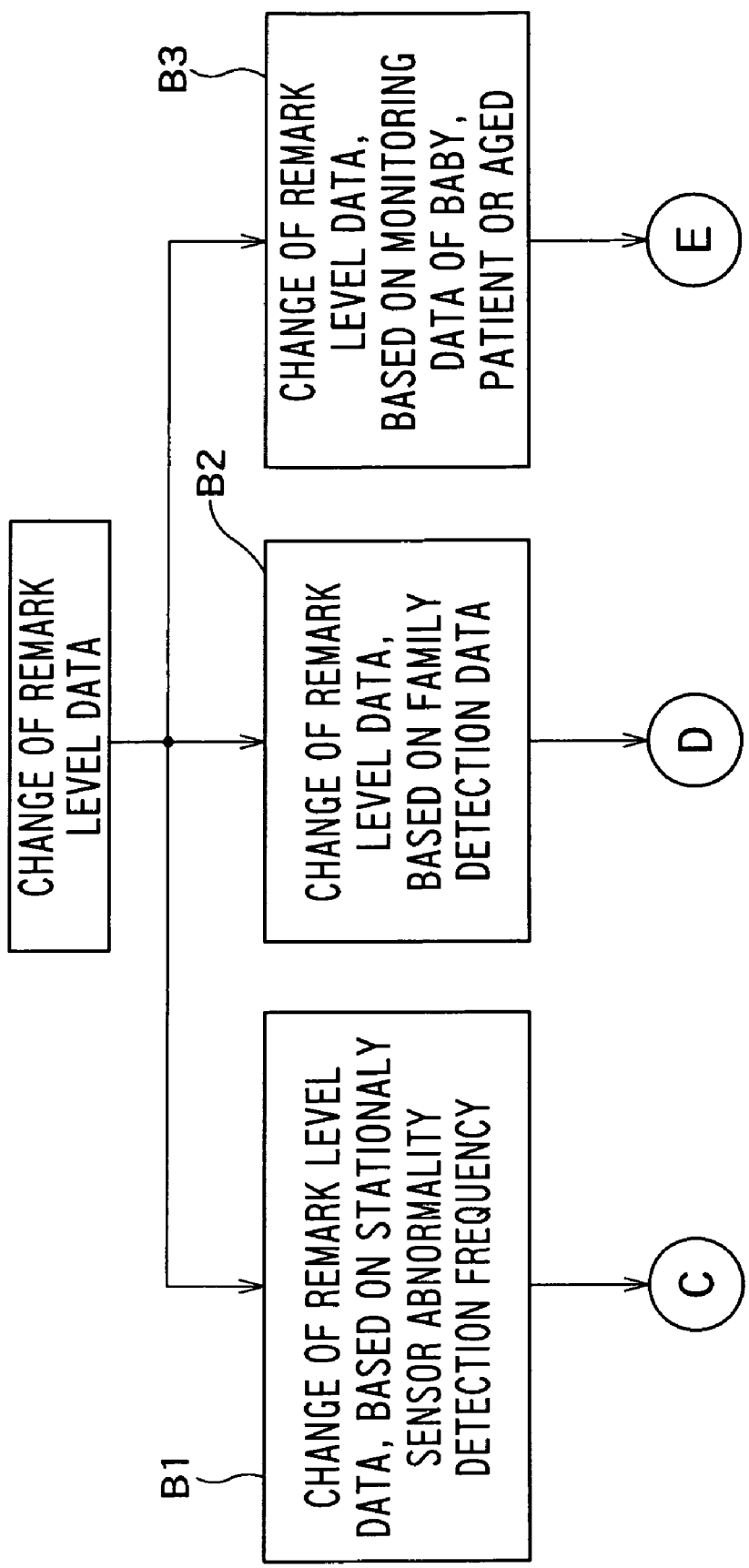
FIG. 9 is a flowchart of exemplary procedures for modifying remark level data once set to stationary sensors and respective rooms in accordance with sensor information by stationary sensors, etc. according to the third embodiment of the invention.

FIG. 9 is a flowchart of procedures for dynamically modifying remark level data once determined for the stationary sensors 1 in accordance with sensor information detected by the stationary sensors 1, etc. themselves.

As its example, FIG. 9 shows remark level data modification (B1) based on data indicating frequencies of abnormality detection by the stationary sensors (abnormality detection frequency data). As other examples, FIG. 9 shows remark level data modification based on family detection data (B2) and remark level data modification based on monitoring data of persons to be cared, such as babies, ill family members, aged persons, etc. (B3). With reference to FIGS. 9 through 12 and FIG. 1 in combination, these three types of processing B1 to B3 in these three examples will be explained below.

First explained is the remark level data modification based on the abnormality detection frequencies of the stationary sensors.

The remark level data modification based on the abnormality detection frequency data of the stationary sensors increases remark levels to a room equipped with a particular stationary sensor 1 when the frequency of abnormality detection by the stationary sensor 1 is high. Accordingly, this type of modification increases the patrol frequency, monitoring time, etc. of the room. As a result, the moving robot 5 monitors the room with a higher probability when the stationary sensor 1 detects an abnormal condition, and this type of modification can enable the system to grasp the current status of the room earlier.

Figure 10:
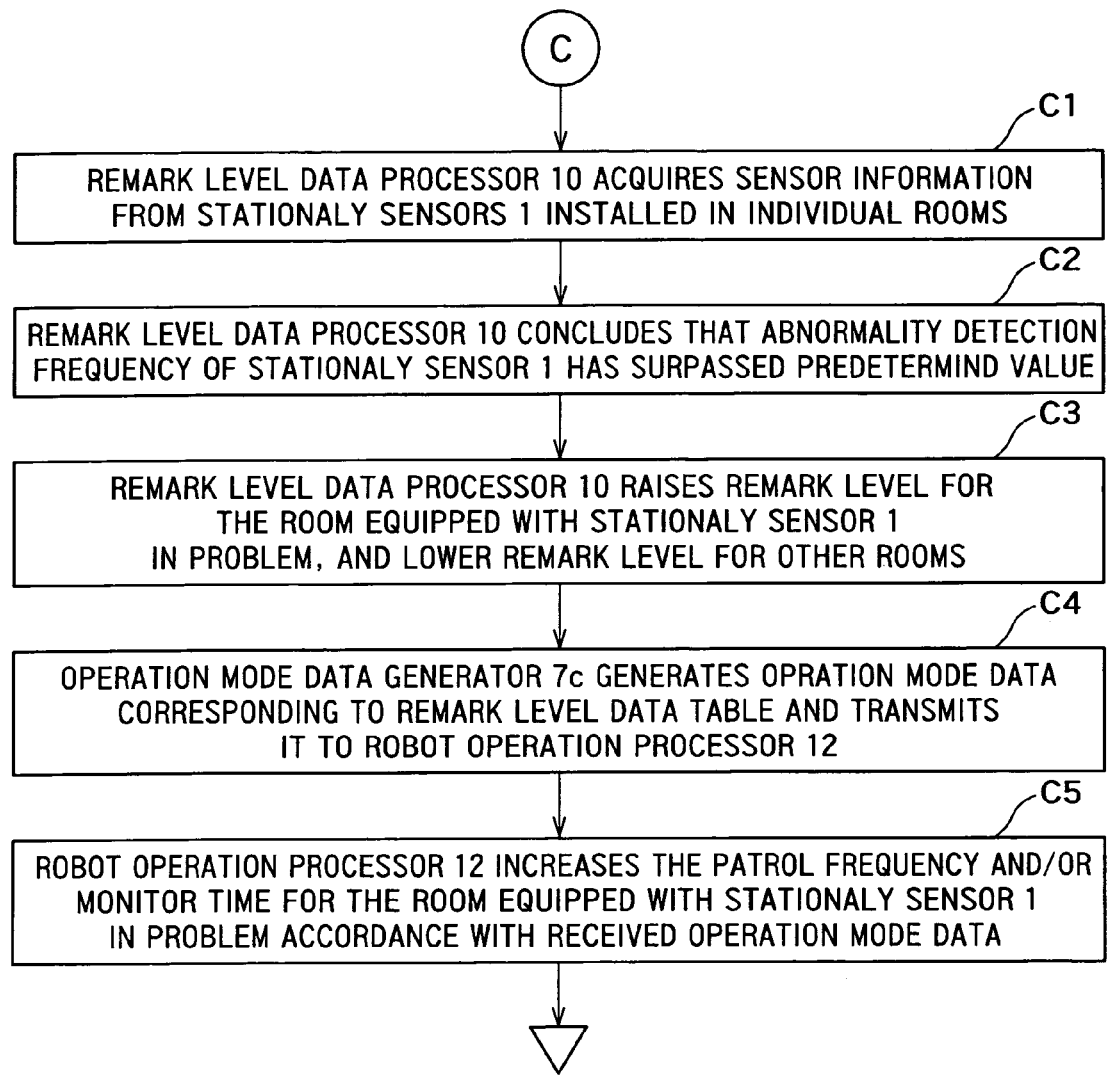
FIG. 10 is a flowchart of exemplary procedures for modifying remark level data on the basis of detection frequencies of stationary sensors.

FIG. 10 is a flowchart for explaining another type of remark level data modification based on the abnormality detection frequency data of stationary sensors.

First, as shown in FIG. 10 and FIG. 1, the remark level data processor 10 in the home server 3 acquires sensor information from stationary sensors installed in individual rooms, and gives it to the sensor information storage device 27a to store it there (C1). Based on the sensor information stored in the sensor information storage device 27a (see FIG. 1), the remark level data processor 10 determines that the abnormality detection frequency of a particular stationary sensor 1 installed in a particular room exceeds a predetermined value (C2). The remark level data processor 10 having determined that the abnormality detection frequency of the particular stationary sensor 1 exceeds the predetermined value increases the remark level of the room or space equipped with the stationary sensor 1 exhibiting the high abnormality detection frequency, and decreases the remark levels of the other rooms or spaces (C3). Based on the modified remark level data table including both the modified remark level and the original (initial) remark level, the operation mode data generator 7c generates operation mode data, and transmits it to the robot operation processor 12 (see FIG. 1) of the moving robot 5 (C4). In receipt of the operation mode data, the robot operation processor 12 increases the patrol frequency and/or monitoring time of the room equipped with the stationary sensor 1 in problem (C5).

Next explained is another type of remark level data modification based on family detection data (B2 of FIG. 9).

This remark level data modification based on the family detection data intends more efficient, energy-saving guard by changing the remark level data of individual rooms and adjusting the patrol frequencies, etc. of the rooms depending upon whether a family member stays in a room in the residence, for example.

Figure 11:
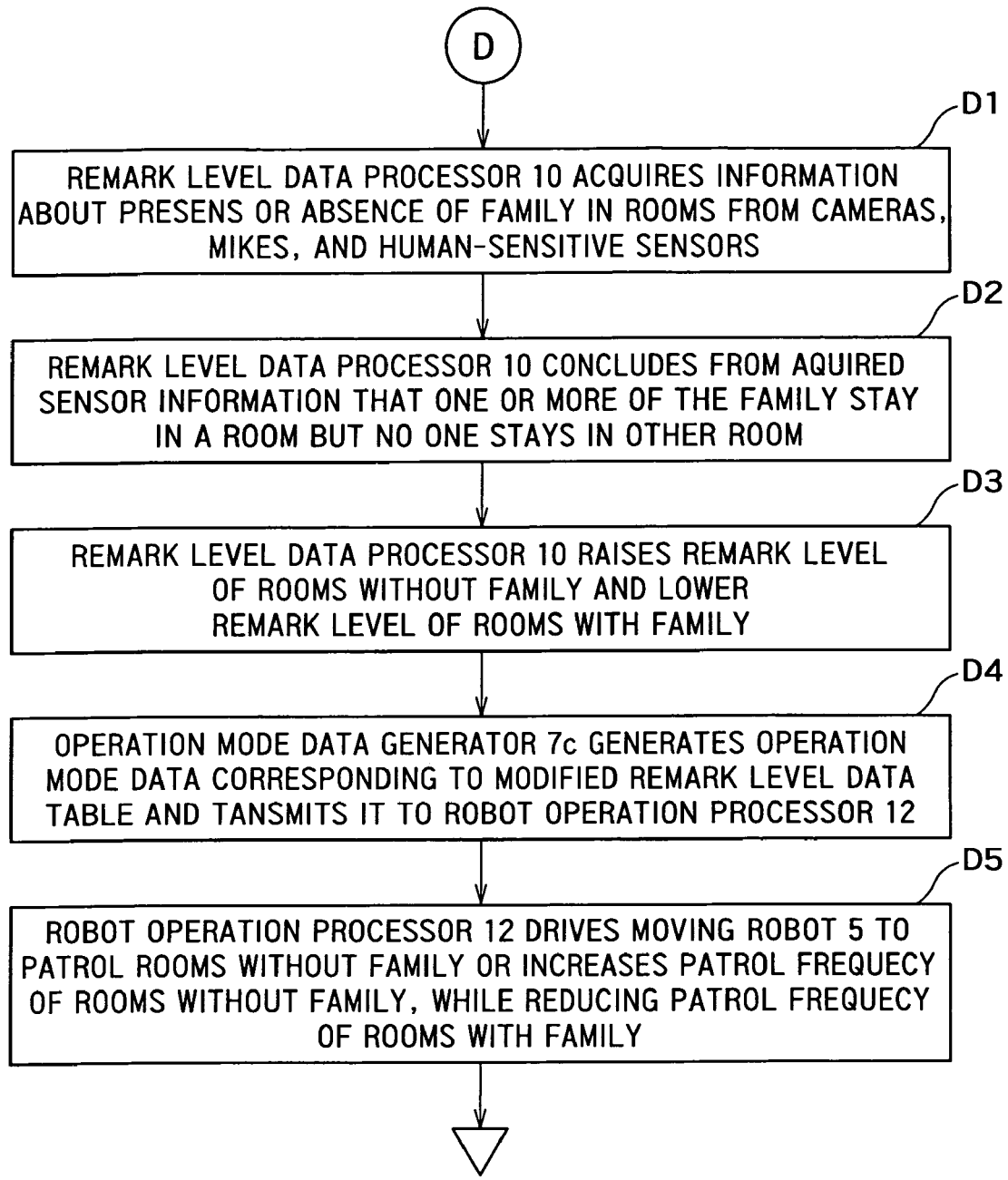
FIG. 11 is a flowchart for explaining an example of modification of remark level data on the basis of detection of family members.

FIG. 11 is a flowchart for explaining the example of remark level data modification based on family detection data.

First, the remark level data processor 10 in the home server 3 acquires information on the presence or absence of any family members in individual rooms from sensors (stationary sensors 1 or on-board sensors 4) such as cameras, microphones, human-sensitive sensors, or the like (D1). Whether or not a person in a room is certainly one of the family members can be identified by personal recognition techniques such as facial recognition or audio recognition. Based on the acquired sensor information, the remark level data processor 10 acknowledges that a family member stays in a certain room but no one is in other rooms (D2). The remark level data processor 10, having acknowledged that there are rooms where there are no family members, raises the remark level of the rooms with no family members and lowers the remark level of rooms with a family member (D3). Based on the modified remark level data table, the operation mode data generator 7c generates operation mode data, and transmits it to the robot operation processor 12 of the moving robot 5 (D4). In receipt of the operation mode data, the robot operation processor 12 of the moving robot 5 decreases the patrol frequency of the rooms with a family member. In parallel, the robot operation processor 12 makes the robot 5 patrol the empty rooms or increases the frequency of the patrol of the empty rooms (D5) in accordance with the operation mode data. Instead of increasing the patrol frequency, sensitivities of individual sensors, directivities of microphones, the patrol area of each moving robot, and the like, may be changed.

Next explained is another type of remark level data modification based on observation data obtained by watching persons to be cared for, such as babies, ill family members or aged persons (see B3 of FIG. 9).

Figure 12:
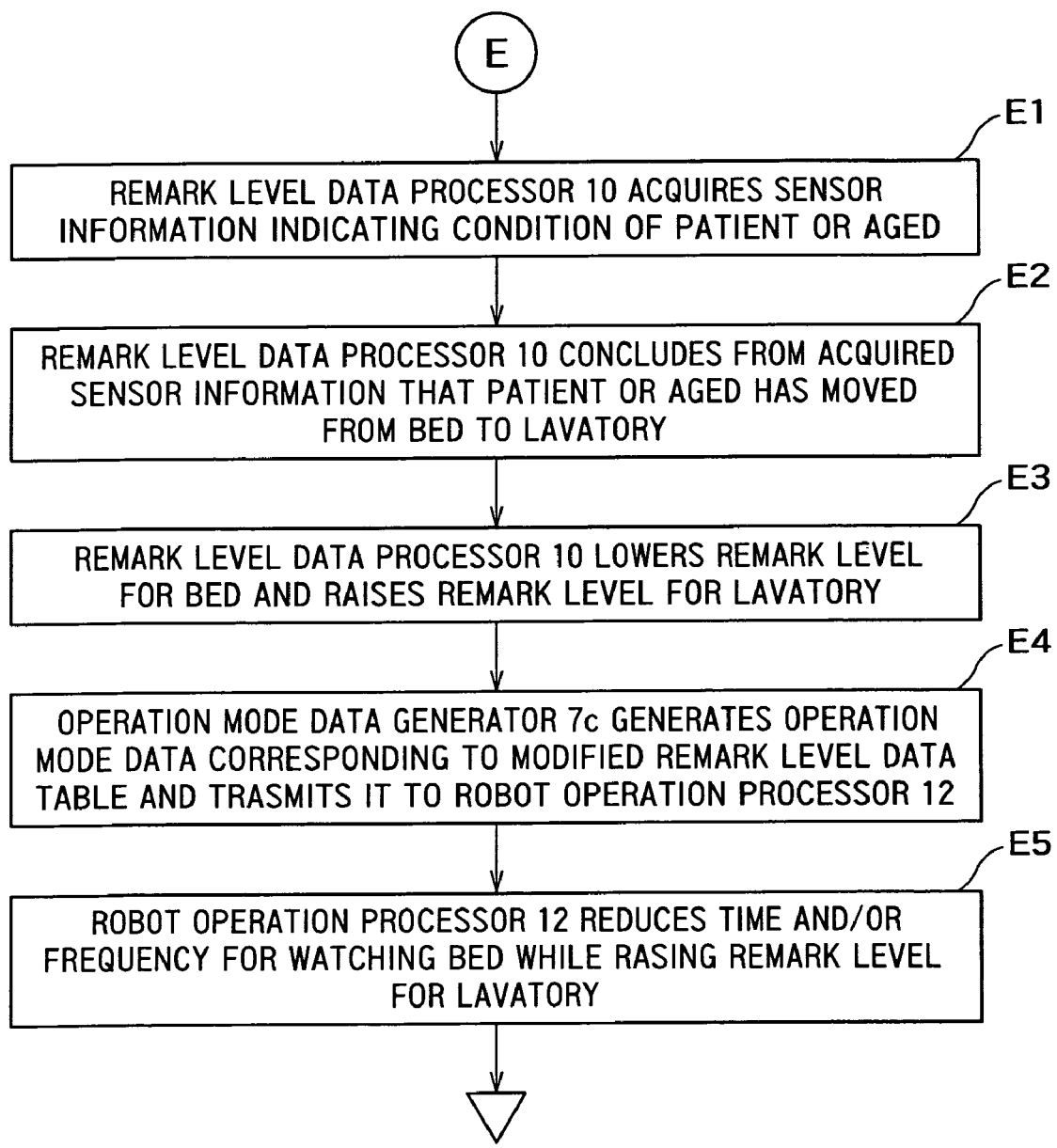
FIG. 12 is a flowchart for explaining an example of modification of remark level data for monitoring a baby, patient or aged person.

FIG. 12 is a flowchart for explaining this example of remark level data modification based on the observation data of babies, ill family members, aged persons, etc.

First, the remark level data processor 10 in the home server 3 acquires knowledge on conditions of an ill person or aged person, for example, as sensor information (E1). In receipt of the knowledge on conditions of the ill person or aged person acquired as sensor information, the remark level data processor 10 determines from the sensor information that an ill person or aged person has moved from his/her bed to the lavatory (E2). The remark level data processor 10, having determined that the ill person or aged person has moved to the lavatory from his/her bed, lowers the remark level of the bed, and raises the remark level data of the lavatory (E3). This example empirically takes into account that accidents often occur in lavatories. Based upon the modified remark level data table, the operation mode data generator 7c generates operation mode data, and transmits it to the robot operation processor 12 of the moving robot 5 (E4). In receipt of the operation mode data, the robot operation processor 12 of the moving robot 5 reduces the time and frequency of watching the bed in accordance with the received operation mode data. In parallel, the robot operation processor 12 makes the robot patrol the lavatory, or increases the frequency of the patrol of the lavatory and enhances sensibilities of sensors (stationary sensors 1 and on-board sensors 4) related to the lavatory.

FOURTH EMBODIMENT

Premonitory Detection

This embodiment intends to have the system prepare against abnormal conditions beforehand by detecting a prognostic situation preceding an abnormal condition as prognostic data by means of stationary sensors before the stationary sensors detect an actual abnormal condition.

Figure 13:
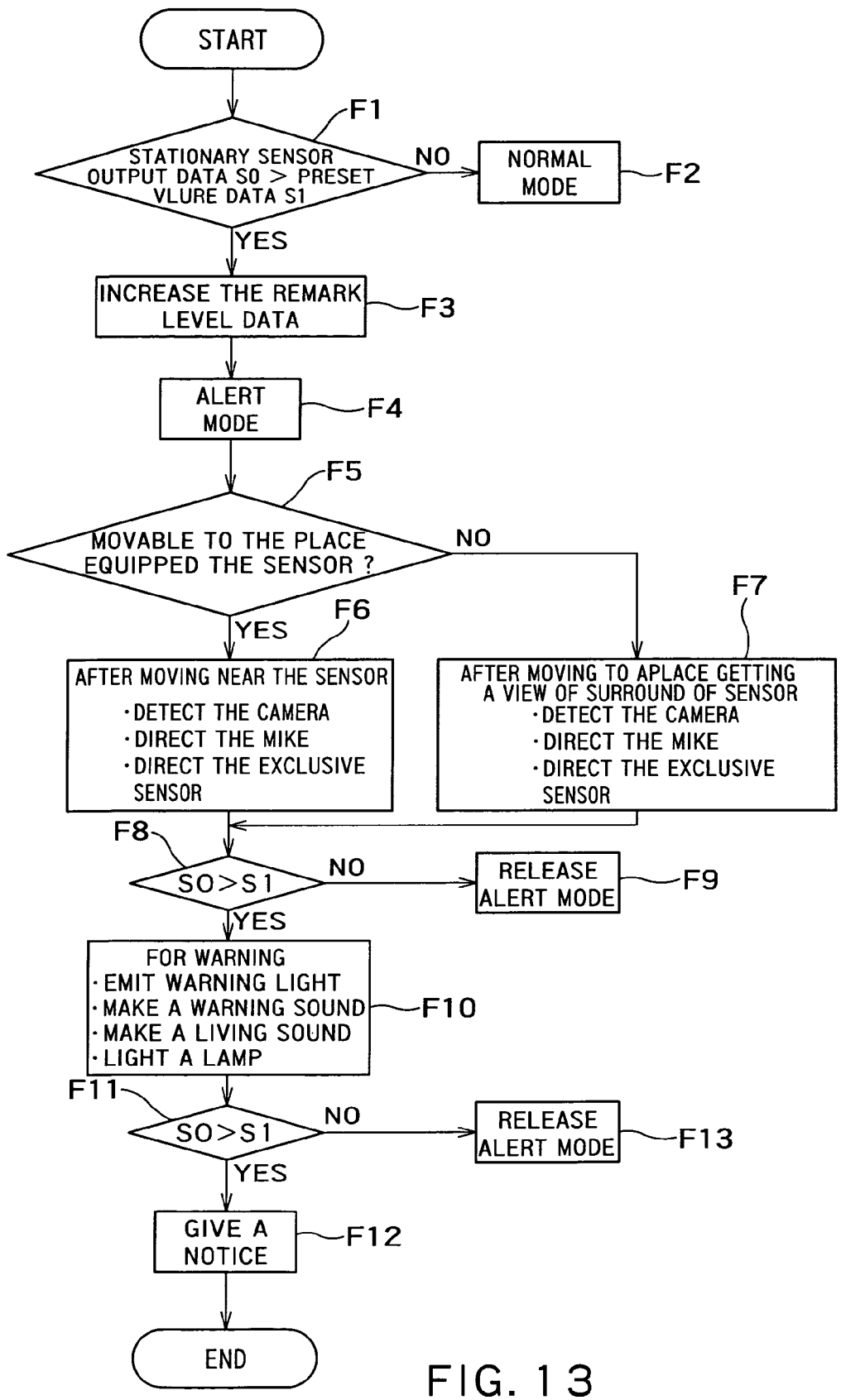
FIG. 13 is a flowchart for explaining a security system according to the fourth embodiment of the invention, in which stationary sensors detect a prognostic situation preceding an abnormal condition.

FIG. 13 is a flowchart for explaining procedures in the security system in which the stationary sensors (see FIG. 1) can detect prognostic situations preceding actual abnormal conditions.

This embodiment is explained below with reference to FIG. 13.

The remark level data processor 10 in the home server 3 estimates whether or not the output data S0 of a vibration sensor installed on a window or a door, for example, (which may be data on the frequency of vibration, amplitude of vibration, rate-of-change of the frequency of vibration, rate-of-change of the amplitude of vibration) is larger than a predetermined value (alert value) data S1 (F1). Note here that S1 is smaller than a data value requiring immediate notification.

If the remark level data processor 10 decides that the output data S0 of the vibration sensor does not exceed the preset data S1 (No to F1), it does not change the remark level data. Accordingly, the moving robot 5 operates in the normal mode (F2).

In contrast, if the remark level data processor 10 decides that the output data S0 of the vibration sensor is larger than the preset data S1 (Yes to F1), it raises the remark level for the portion (window or door) equipped with the vibration sensor (F3) and lowers the remark level for other places.

Based on the modified remark level data table, the operation mode data generator 7c generates operation mode data and transmits it to the robot operation processor 12. In receipt of the operation mode data, the robot operation processor 12 sets the moving robot 5 in the alert mode (first alert mode) in accordance with the operation mode data (F4).

After setting the moving robot 5 in the alert mode, the robot operation processor 12 evaluates whether or not the moving robot 5 can move to the window or door equipped by the vibration sensor with reference to the map information of the residence stored in the storage device 5b of the moving robot 5 (see FIG. 1), on-board sensors, etc. (F5).

If the robot operation processor 12 estimates that the moving robot 5 can move to the window or door equipped with the vibration sensor (Yes to F5), then it moves the moving robot 5 to the window or door (F6). Then, the robot operation processor 12 drives the moving robot 5 to conduct movements in accordance with the output condition of the vibration sensor, such as focusing the camera at the window or door, increasing the sensitivity of the microphone and turning an exclusive sensor to the window or door, for example (F6).

If the robot operation processor 12 estimates that it is not possible to move the moving robot 5 to the window or door equipped with the vibration sensor because of hindrance of an obstacle (No to F5), for example, it moves the moving robot 5 to a position acceptable for watching an area close to the window or door equipped with the vibration sensor through the camera (F7) with reference to the map information of the residence, or the like. Then, the robot operation processor 12 drives the moving robot 5 to conduct movement in accordance with the output condition of the vibration sensor, such as focusing the camera at the window or door, increasing the sensitivity of the microphone and turning an exclusive sensor to the window or door, for example (F7).

After the moving robot 5 is moved to the place near the window or door equipped with the vibration sensor (F6, F7) as stated above, the remark level processor 10 receives the output data S0 of the vibration sensor again, and evaluates whether or not it is larger than the preset value data S1 (F8).

If the remark level data processor 10 determines that the output data S0 of the vibration sensor is smaller than the preset value (alert value) data S1 (No to F8), then it returns the remark level data once changed in the step F3 to the original value. As a result, the moving robot 5 is released from the alert mode and restores the normal mode.

If the remark level data processor 10 determines that the output data S0 of the stationary sensor 1 is still larger than the preset value (alert value) data S1 (Yes to F8) then it again modifies the remark level data, and sets the moving robot 5 in the warning mode (second alert mode). The moving robot 5 in the warning mode takes warning actions using warning sound or emission of light, or takes an action that someone would believe to be done by a person, such as turning on the TV or lamps, or generating some kind of sound, for example (F10).

If the remark level data processor 10 determines that the output data S0 of the vibration sensor is still larger than the preset value data S1 even after the warning actions (Yes to F11), then it transmits warning condition data indicating that the output data S0 of the vibration sensor continues to surpass the alert value data to the host computer 8 of the security agency and/or the mobile terminal 9b and portable alarm device 9a that a family member, for example, brings with him/her (F12). That is, it carries out the process for informing the security agency or family of the alert condition in the residence (F12). After that, if the remark level data processor 10 determines that the output data S0 of the vibration sensor exceeds the preset value (alert value) data S1 and reaches the predetermined abnormal value data, then it instructs the moving robot 5 to store the conditions near the vibration sensor that appear just at the time of and after the output data S0 of the vibration sensor exceeds the preset value (alert value) data S1.

If the remark level data processor 10 determines that the output data S0 of the vibration sensor decreases below the alert value data S1 after the warning actions (No to F11), then it changes the remark level data again and releases the warning mode (F13).

The instant embodiment explained above has the following effects.

Conventional systems cannot cope with an abnormal condition before the detection value of a sensor like a vibration sensor installed on a window or door, for example. That is, they can cope with the abnormal condition only after the abnormal condition such as destruction of a windowpane occurs.

The security system according to the instant embodiment, however, can detect a previous sign of a possible abnormal condition as a prognostic situation when the detection value of a sensor like a vibration sensor exceeds the preset value (alert value) even though it is still below the abnormal value. Therefore, the security system according to the instant embodiment can prepare for the possible abnormal condition earlier. For example, at the stage where the vibration sensor installed on a window detects continuous vibration of the windowpane, the security system can instruct the moving robot to monitor the vibration, and can be ready for a possible abnormal condition earlier.

FIFTH EMBODIMENT

Sensor Substitution

This embodiment intends to use on-board sensors mounted on and in the robot as substitutive sensors when stationary sensors installed in a residence or a building do not work.

Figure 14:
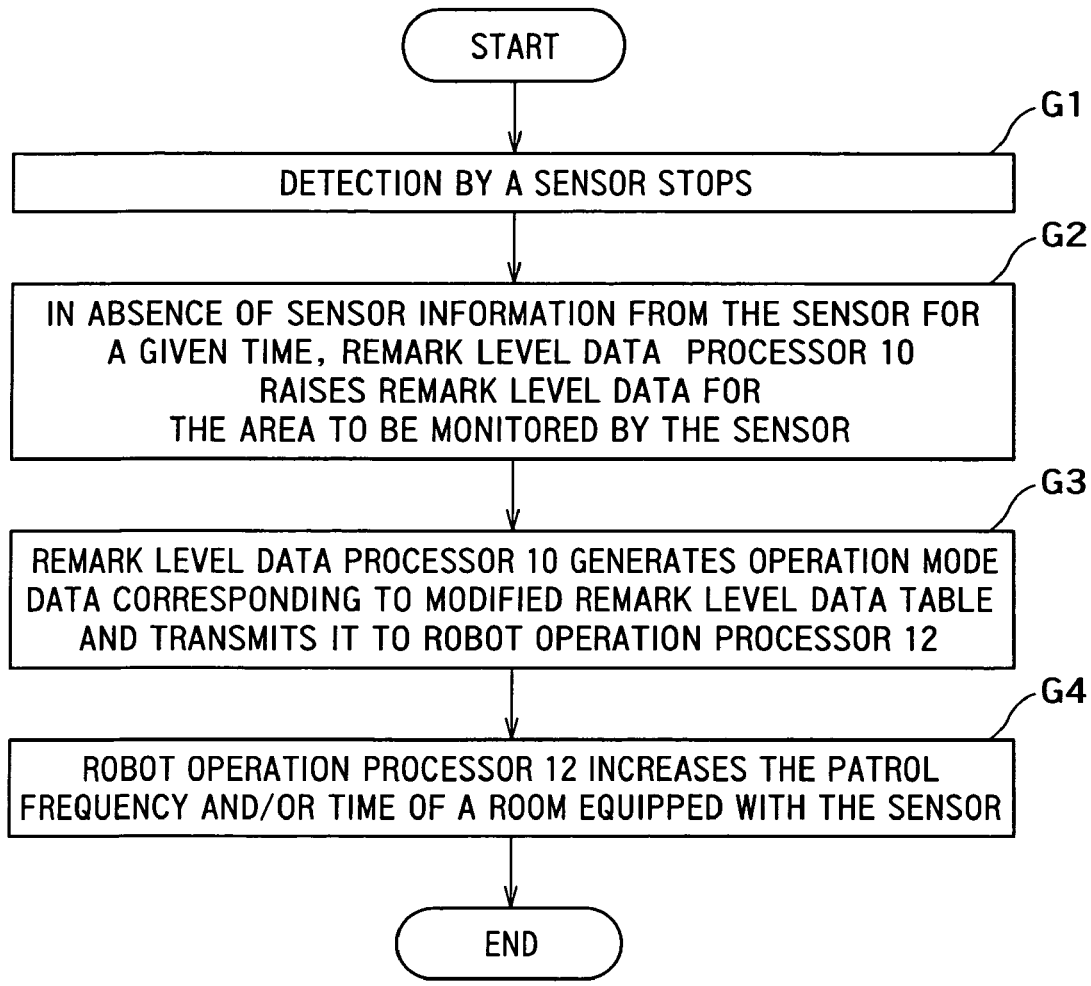
FIG. 14 is a flowchart for explaining a security system according to the fifth embodiment of the invention, in which a moving robot is used as monitoring means in lieu of stationary sensors.

FIG. 14 is a flowchart showing an example of procedures for using on-board sensors to do the monitoring service to be carried out by the stationary sensors 1 (see FIG. 1).

An example of procedures for this purpose is explained below with reference to FIG. 14.

Assume first that the detecting motion of a window motion sensor installed on a window of a room stopped (G1).

The remark level data processor 10 regards the window motion sensor to be out of order from the fact that sensor information from the window motion sensor is not received for a certain duration of time, and raises the remark level for the area to be watched by the window motion sensor, such as the room equipped with the window motion sensor, for example (G2).

Based on the modified remark level data table, the operation mode data generator 7c generates operation mode data, and transmits it to the robot operation processor 12 (G3).

In receipt of the operation mode data, the robot operation processor 12 increases the patrol frequency or monitoring time of the room, for example, equipped with the window motion sensor (G4). Especially when the room equipped with the window motion sensor is an important room from the viewpoint of security, the moving robot stays in that room and continues watching it in place of the window motion sensor out of order until the window motion sensor is repaired.

The embodiment explained above assures the following effects.

Heretofore, if such a window-motion sensor installed on a window is out of order, conventional security systems merely inform the host computer of the security agent of the fact that the window motion sensor does not work properly. Therefore, the security agent must interrupt the monitoring of the area to be watched by the window motion sensor dispatch until a staff dispatched to the residence equipped with the broken window motion sensor repairs it or exchanges it with another.

In the instant embodiment, however, the watching service to be executed by the out-of-order window motion sensor is taken over by an on-board sensor of the moving robot. Therefore, the area equipped with the broken window motion sensor can be watched continuously even after the window motion sensor does not work.

SIXTH EMBODIMENT

Monitoring Daily Life

It is indispensable to watch an aged person living with a family. For the purpose of continuously monitoring an aged person, a sensor such as a pressure sensor may be installed on a bed sheet or a leg of the bed the aged person uses, or on the floor of the room the ages person uses. Thus, it is possible to ascertain through a pressure sensor, or the like, installed on the bed sheet or the bed leg, for example, whether the aged person is on the bed or not. Further, it is possible to ascertain through a pressure sensor installed in the room of the aged person whether the aged person currently lies or sits on the bed. The lavatory, bath, etc. used by the aged person may be equipped with door sensors or human-sensitive sensors to monitor the living condition of the aged person in the residence. The instant embodiment intends to combine the monitoring service by stationary sensors such as pressure sensors, door sensors, human-sensitive sensors, etc. with the monitoring service of on-board sensors of a moving robot for the purpose of effectively confirming the aged person's condition.

Figure 15:
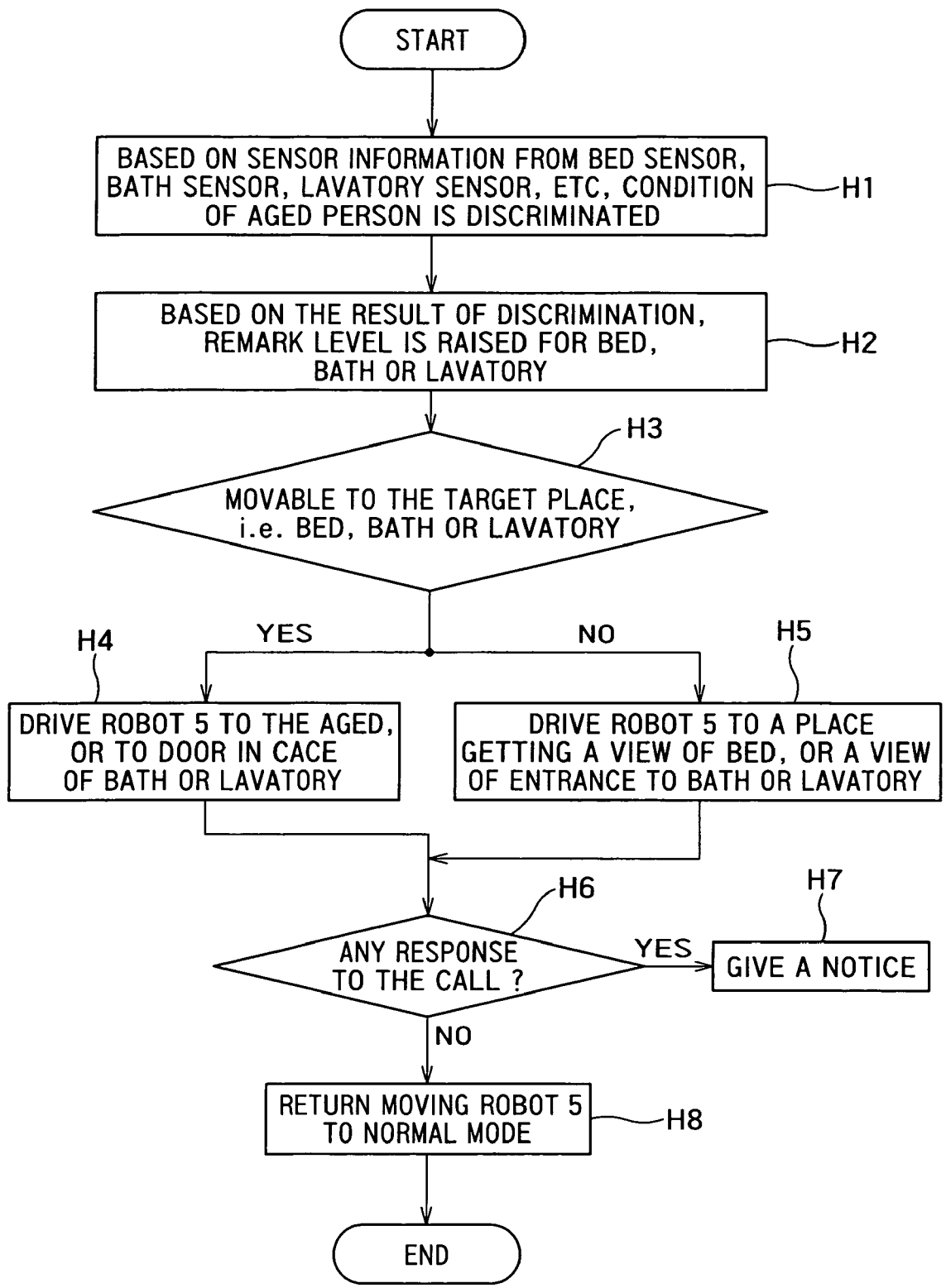
FIG. 15 is a flowchart showing exemplary procedures for monitoring the life of an aged person by a security system according to the sixth embodiment of the invention.

FIG. 15 is a flowchart showing exemplary procedures for monitoring the movements of an aged person by means of a security system according to the embodiment.

Explained below ate procedures for this purpose will be explained below with reference to FIG. 15.

Based on sensor information sent from stationary sensors 1 (see FIG. 1) such as a bed sensor, bath sensor, lavatory sensor, etc., the remark level processor 10 ascertains behaviors or conditions of the aged person, whether the aged person gets up, takes a bath or enters the lavatory, for example (H1). Whether the aged person enters the lavatory or not can be known through a door motion sensor installed on the door.

Based on the determination, the remark level data processor 10 raises the remark level for the bed, bath or lavatory (H2), and lowers the remark levels for the other places.

Based on the modified remark level data table, the operation mode data generator 7c generates operation mode data, and transmits it to the robot operation processor 12. In receipt of the operation mode data, the robot operation processor 12 evaluates whether or not the moving robot 5 can move to the target place (for example, bed, bath or lavatory, for example) with reference to the map information of the residence stored in the storage device 5c of the moving robot 5 (H3).

If the robot operation processor 12 concludes with reference to the map information that the moving robot 5 can move to the target place (bed, bath or lavatory, for example) (Yes to H3), then it moves the moving robot 5 close to the aged person staying in the target place (H4). However, if the target place is the lavatory or bath, the moving robot is moved to the door of the lavatory or bath.

If the robot operation processor 12 concludes with reference to the map information of the residence that the moving robot 5 cannot move to the target place because of existence of an obstacle (No to H4), then it moves the moving robot 5 up to a position where the robot can see the bed or to a position where the robot can see the entrance to the lavatory or bath (H5).

After the moving robot 5 reaches the appropriate position, the robot operation processor 12 takes the procedure for confirming the condition, by calling to the aged person, for example, by using a speaker mounted on the robot 5 (H6).

If response data from the aged person to the call is confirmed (received), the remark level processor 10 determines that the aged person is in a normal condition, and returns the remark level data to the original value, and returns the moving robot 5 to the normal mode (H7).

If the remark level processor 10 decides that no response data is received from the aged person to the call or help data indicating the request for help from the aged person is received (No to H6), then it transmits the aged person's condition data indicating the condition of the aged person to let the family or the security center know the abnormal condition of the aged person (H8). In more particularly, the moving robot 5 transmits aged person's condition data indicating the condition of the aged person to the mobile terminal 9b, portable alarm device 9a or host computer 8 in order to let the family or the security center know the abnormal condition of the aged person (H8). For this purpose, it is also possible to connect the moving robot 5 to the host computer 8 by a TV telephone through the home server 3 to let the security center know the aged person's condition by voice.

The message to the security center or family may be given when it is determined that the aged person does not get up in the morning, the aged person turns in bed frequently, the aged person has a bad cough, he/she does not come out from the lavatory or bath for a long time. Furthermore, sensors for acquiring biomedical data, such as body temperature, blood pressure, respiration, heartbeat, and so on, may be set on the aged person or patient. In this case, it is possible to grasp his/her condition from the sensor information by communication. If such sensors can transmit a signal indicating positional information as well, it is possible to know the position where the family currently is more easily.

As explained above, this embodiment uses the moving robot to monitor the daily life of an aged person, for example, to grasp conditions of an aged person. Therefore, also when the aged person is in abnormal conditions and cannot communicate with the family or some one outside by him/herself, the security system assures quick communication about his/her condition.

Other embodiments of the present invention will be apparent to those skilled in the art from consideration of the specification and practice of the invention disclosed herein. It is intended that the specification and example embodiments will be considered as exemplary only, with a true scope and spirit of the invention being indicated by the following.

What is claimed is:

1. A security system comprising:
  a first sensor disposed in an area to be monitored in a building, to monitor the area;
  a moving robot having a robot main body, a second sensor for monitoring the area to be monitored and a robot operation processor for moving the robot main body according to an operation mode data indicating an operation of the robot main body; and
  a controller including first and second sensor information monitor means for collecting first sensor information and second sensor information which are acquired by the first and second sensors, and an operation mode data generator for generating the operation mode data from the first sensor information or the second sensor information and transmitting the operation mode data to the robot operation processor,
  wherein the controller further includes a remark level data memory storing remark level data indicating a monitoring weight for a target to be monitored by the first sensor or the second sensor, the remark level data processor renews the remark level data in the remark level data memory by using the first or the second sensor information during a patrol operation of the robot, and the moving robot patrols in the building on the basis on the remark level data and the operation mode data.

2. A moving robot provided in a security system, which includes a stationary sensor installed in an area to be monitored in a building, to monitor the area and a server transmitting abnormal condition data indicating an abnormal condition when the stationary sensor detects the abnormal condition, comprising:

a robot main body movable in the area to be monitored;

an on-board sensor mounted on the robot main body to monitor the area;

a sensor information monitor which, during use, collects at least on-board sensor information acquired by the on-board sensor;

an operation mode data generator which, during use, generates operation mode data of the robot main body by using at least the on-board sensor information;

a robot operation processor which, during use, activates the robot main body in accordance with the operation mode data;

a remark level data memory which, during use, contains remark level data which indicates a monitoring weight for a target to be monitored by the stationary sensor or the on-board sensor; and a remark level data processor which, during use, renews the remark level data in the remark level data memory by using the on-robot sensor information during a patrol operation of the robot, wherein the moving robot cooperates with the stationary sensor to monitor the area to be monitored and the moving robot patrols in the building on the basis of the remark level data and the operation mode data.

* * * * *